United States Patent
Watanabe et al.

(10) Patent No.: US 12,071,504 B2
(45) Date of Patent: Aug. 27, 2024

(54) POLYESTER POLYOL AND POLYURETHANE

(71) Applicant: DAICEL CORPORATION, Osaka (JP)

(72) Inventors: Jun Watanabe, Tokyo (JP); Takashi Konno, Tokyo (JP); Shintarou Hatanaka, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 636 days.

(21) Appl. No.: 17/298,215

(22) PCT Filed: Nov. 27, 2019

(86) PCT No.: PCT/JP2019/046390
§ 371 (c)(1),
(2) Date: May 28, 2021

(87) PCT Pub. No.: WO2020/111130
PCT Pub. Date: Jun. 4, 2020

(65) Prior Publication Data
US 2022/0089807 A1  Mar. 24, 2022

(30) Foreign Application Priority Data
Nov. 30, 2018  (JP) .................. 2018-225692

(51) Int. Cl.
| | |
|---|---|
| C08G 18/46 | (2006.01) |
| C08G 18/10 | (2006.01) |
| C08G 18/42 | (2006.01) |
| C08G 18/76 | (2006.01) |
| C08G 63/08 | (2006.01) |
| C08G 63/685 | (2006.01) |
| C08G 63/82 | (2006.01) |
| C08K 5/053 | (2006.01) |
| C08L 75/06 | (2006.01) |

(52) U.S. Cl.
CPC ......... *C08G 18/4615* (2013.01); *C08G 18/10* (2013.01); *C08G 18/4277* (2013.01); *C08G 18/7671* (2013.01); *C08G 63/08* (2013.01); *C08G 63/685* (2013.01); *C08G 63/823* (2013.01); *C08K 5/053* (2013.01); *C08L 75/06* (2013.01); *C08L 2312/00* (2013.01)

(58) Field of Classification Search
CPC .... C08G 63/08; C08G 63/685; C08G 63/823; C08G 18/4615; C08G 18/4277
See application file for complete search history.

(56) References Cited

U.S. PATENT DOCUMENTS

| | | | | |
|---|---|---|---|---|
| 3,169,945 A | * | 2/1965 | Young .................... | C08G 69/44 524/223 |
| 3,284,417 A | * | 11/1966 | Hostettler ............. | C08G 63/08 528/357 |
| 4,379,915 A | * | 4/1983 | Watanabe .......... | C08G 18/4277 528/357 |
| 5,855,630 A | * | 1/1999 | Lin ........................ | C10L 1/2387 554/56 |
| 6,172,167 B1 | * | 1/2001 | Stapert ............... | C08G 18/3823 525/425 |
| 2005/0027095 A1 | | 2/2005 | Wamprecht et al. | |

FOREIGN PATENT DOCUMENTS

| | | |
|---|---|---|
| JP | 3-28225 A | 2/1991 |
| WO | WO 98/00454 A1 | 1/1998 |

OTHER PUBLICATIONS

International Search Report issued Feb. 4, 2020, in PCT/JP2019/046390.
Written Opinion of the International Searching Authority issued Feb. 4, 2020, in PCT/JP2019/046390.
Extended European Search Report for corresponding European Application No. 19888725.9, dated Jul. 15, 2022.

* cited by examiner

*Primary Examiner* — Michael L Leonard
(74) *Attorney, Agent, or Firm* — Birch, Stewart, Kolasch & Birch, LLP

(57) ABSTRACT

Provided is a polyester polyol that can be used for forming a polyurethane excelling in durability and solvent resistance. A polyester polyol of the present invention is represented by Formula (1) and has a molecular weight distribution of less than 1.2: In Formula (1), $R^1$ and $R^2$ represent, identically or differently a divalent hydrocarbon group, and n is an integer. $R^3$ to $R^7$ represent, identically or differently a hydrogen atom, a monovalent hydrocarbon group, or a group represented by Formula (2): In Formula (2), m and s represent, identically or differently an integer of 1 or greater. 2m occurrences of $R^8$ represent, identically or differently a hydrogen atom, an alkyl group, or an alkoxy group. Note that at least two of the groups represented by $R^3$ to $R^7$ are represented by Formula (2):

[Chem. 8]

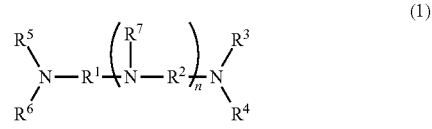

(1)

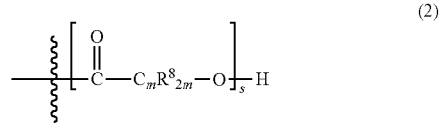

(2)

7 Claims, No Drawings

POLYESTER POLYOL AND POLYURETHANE

TECHNICAL FIELD

The present invention relates to a novel polyester polyol and a polyurethane obtained using the polyester polyol. The present patent application claims priority from the Japanese Patent Application No. 2018-225692 filed in Japan on Nov. 30, 2018, the contents of which are incorporated herein.

BACKGROUND ART

Polyester polyols obtained by using a polyol as an initiator and subjecting a cyclic ester such as caprolactone to ring-opening polymerization with the initiator have been commonly used as raw materials for polyurethane. Such polyester polyols have been used because a polyurethane excelling in water resistance and flexibility can be obtained.

However, with such polyurethanes resulting from the use of, as a raw material, a polyester polyol obtained by using the polyol as an initiator and subjecting a cyclic ester such as caprolactone to ring-opening polymerization with the polyol, mechanical strength is insufficient, and thus use of such polyurethanes in particularly applications requiring durability has been difficult.

Patent Document 1 describes a polyester polyol obtained using an alkanolamine and/or a diamine as a polyol, and indicates that a polyurethane obtained using the polyester polyol exhibits excellent durability.

CITATION LIST

Patent Document

Patent Document 1: JP 03-28225 A

SUMMARY OF INVENTION

Technical Problem

However, even if the polyester polyol described in Patent Document 1 is used, the resulting polyurethane is still insufficient in terms of durability. The resulting polyurethane is also inferior in terms of solvent resistance.

Therefore, an object of the present invention is to provide a polyester polyol that can be used for forming a polyurethane excelling in durability and solvent resistance.

Another object of the present invention is to provide a polyester polyol that can be used for forming a polyurethane excelling in water resistance, flexibility, durability, and solvent resistance.

Yet another object of the present invention is to provide a polyurethane excelling in durability and solvent resistance.

Solution to Problem

As a result of diligent research to solve the problems described above, the present inventors discovered that with polyester polyols obtained by using a small amount of a tin compound as a catalyst and subjecting a cyclic ester to ring-opening polymerization with a polyamine as an initiator, the molecular weight distribution is very narrow with excellent uniformity, and that a polyurethane obtained using the polyester polyol as a raw material exhibits excellent cohesive force uniformly across the entire molecular chain of the polyurethane due to the amide bonds in the polyester polyol while also exhibiting water resistance and flexibility, and thereby the polyurethane exhibits excellent durability (in particular, excellent tensile strength and tear strength) and excellent solvent resistance. The present invention was completed based on these findings.

That is, the present invention provides a polyester polyol that is represented by Formula (1) below and has a molecular weight distribution of less than 1.2:

[Chem. 1]

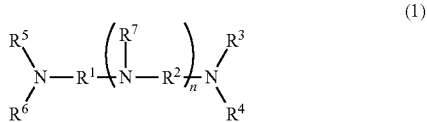

(1)

[In Formula (1), $R^1$ and $R^2$ represent, identically or differently a divalent hydrocarbon group, and n represents an integer. $R^3$ to $R^7$ represent, identically or differently a hydrogen atom, a monovalent hydrocarbon group, or a group represented by Formula (2) below:

[Chem. 2]

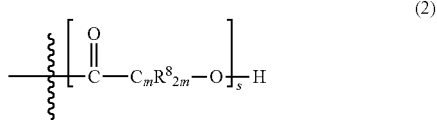

(2)

(In Formula (2), m and s represent, identically or differently an integer of 1 or greater. 2m occurrences of $R^8$ represent, identically or differently a hydrogen atom, an alkyl group or an alkoxy group.) Note that at least two of the groups represented by $R^3$ to $R^7$ are groups represented by Formula (2).]

The present invention also provides the abovementioned polyester polyol having the number average molecular weight from 500 to 2500.

The present invention also provides the abovementioned polyester polyol, in which $R^1$ and $R^2$ in Formula (1) represent, identically or differently a divalent aliphatic hydrocarbon group.

The present invention also provides the abovementioned polyester polyol, in which m in Formula (2) is 5 or 6.

The present invention also provides a method of producing a polyester polyol, in which a compound represented by Formula (11) is used as an initiator in the presence of from 1 to 20 ppm of a tin compound, the method comprising subjecting a cyclic ester to ring-opening polymerization with the initiator:

[Chem. 3]

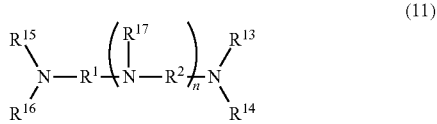

(11)

(In Formula (11), $R^1$ and $R^2$ represent, identically or differently a divalent hydrocarbon group, and n represents an integer. $R^{13}$ to $R^{17}$ represent, identically or differently a hydrogen atom or a monovalent hydrocarbon group.)

The present invention also provides a polyurethane including a segment formed from a product of addition polymerization of the abovementioned polyester polyol and a polyisocyanate.

The present invention also provides the abovementioned polyurethane, further including a segment formed from a product of addition polymerization of a polyisocyanate and a compound other than the polyester polyol but containing at least two groups having reactivity with an isocyanate group.

Advantageous Effects of Invention

When the polyester polyol of the present invention is used as a raw material, a polyurethane excelling in water resistance, flexibility, durability, and solvent resistance can be produced.

Furthermore, a polyurethane obtained using the polyester polyol of the present invention as a raw material also exhibits water resistance, flexibility, durability, and solvent resistance. Therefore, the obtained polyurethane can be suitably used in various molded products, fibers, films, sheets, resin or elastomer raw materials, modifiers, paints, adhesives, and the like.

DESCRIPTION OF EMBODIMENTS

[Polyester Polyol]

The polyester polyol according to an embodiment of the present invention is a compound represented by Formula (1) below. The polyester polyol according to an embodiment of the present invention is characterized by having at least two amide bonds per molecule.

[Chem. 4]

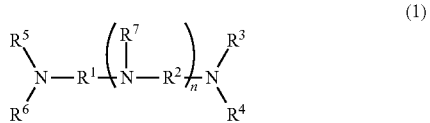
(1)

[In Formula (1), $R^1$ and $R^2$ represent, identically or differently a divalent hydrocarbon group, and n represents an integer. $R^3$ to $R^7$ represent, identically or differently a hydrogen atom, a monovalent hydrocarbon group, or a group represented by Formula (2) below:

[Chem. 5]

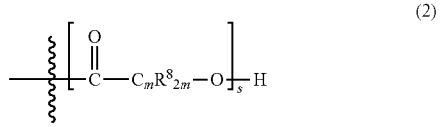
(2)

(In Formula (2), m and s represent, identically or differently an integer of 1 or greater. 2m occurrences of $R^8$ represent, identically or differently a hydrogen atom, an alkyl group or an alkoxy group.) Note that at least two of the groups represented by $R^3$ to $R^7$ are groups represented by Formula (2).]

Examples of the divalent hydrocarbon groups of $R^1$ and $R^2$ include a divalent aliphatic hydrocarbon group, a divalent alicyclic hydrocarbon group, a divalent aromatic hydrocarbon group, and a divalent group formed by bonding at least two groups selected from these groups.

Examples of the divalent aliphatic hydrocarbon group include linear or branched alkylene groups having from 1 to 10 carbons, such as a methylene group, a methylmethylene group, a dimethylmethylene group, an ethylene group, a propylene group, a trimethylene group, and a butylene group; linear or branched alkenylene groups having from 2 to 10 carbons, such as vinylene, propenylene, 1-butenylene, 2-butenylene, butadienylene, pentenylene, hexenylene, heptenylene, and octenylene groups; and linear or branched alkynylene groups having from 2 to 10 carbons, such as a propynylene group.

Examples of the divalent alicyclic hydrocarbon group include cycloalkylene groups having from 3 to 10 carbons (including cycloalkylidene groups), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group; cycloalkenylene groups having from 3 to 10 carbons, such as a cyclopropenylene group, a cyclobutenylene group, a cyclopentenylene group, a cyclohexenylene group, and a cyclooctenylene group; and cross-linked cyclic groups such as an adamantane-1,3-diyl group.

Examples of the divalent aromatic hydrocarbon group include a 1,2-phenylene group, a 1,3-phenylene group, a 1,4-phenylene group, a 1,4-naphthylene group, and a biphenylene group.

Among these, divalent aliphatic hydrocarbon groups are preferable as the divalent hydrocarbon groups of $R^1$ and $R^2$, and a linear or branched alkylene group having from 1 to 10 carbons is particularly preferable.

In Formula (1), n is an integer and is preferably an integer from 0 to 5, and particularly preferably from 0 to 3.

Examples of the monovalent hydrocarbon group of $R^3$ to $R^7$ include a monovalent aliphatic hydrocarbon group, a monovalent alicyclic hydrocarbon group, a monovalent aromatic hydrocarbon group, and a monovalent group formed by bonding at least two groups selected from these groups. Specific examples of these include monovalent groups corresponding to the abovementioned divalent hydrocarbon groups.

Among these, monovalent aliphatic hydrocarbon groups are preferable as the monovalent hydrocarbon groups of $R^3$ to $R^7$, and a linear or branched alkyl group having from 1 to 10 carbons is particularly preferable.

Examples of the alkyl group of $R^8$ include linear or branched alkyl groups having from 1 to 5 carbons, such as a methyl group, an ethyl group, a propyl group, a n-butyl group, and a t-butyl group.

Examples of the alkoxy group of $R^8$ include linear or branched alkoxy groups having from 1 to 5 carbons, such as a methoxy group, an ethoxy group, a propoxy group, an n-butoxy group, and a t-butoxy group.

The integers m and s represent, identically or differently an integer of 1 or greater. For m, an integer from 2 to 10 is preferable. For s, it is preferably an integer from 3 to 20, and particularly preferably an integer of from 4 to 12. Note that when s is an integer of 2 or greater, each of the s quantity of groups expressed in the square brackets in Formula (2) may be the same or different.

The polyester polyol according to an embodiment of the present invention has excellent uniformity, and the molecular weight distribution ((weight average molecular weight)/(number average molecular weight)) is less than 1.2, and preferably 1.1 or less. Therefore, when the polyester polyol is used as a raw material of a polyurethane, a polyurethane excelling in durability and solvent resistance can be obtained.

The number average molecular weight of the polyester polyol according to an embodiment of the present invention is, for example, from 500 to 2500, and among this range, from the perspective of being able to obtain a polyurethane excelling in durability and solvent resistance when the polyester polyol is used as a raw material for a polyurethane, the number average molecular weight of the polyester polyol is preferably from 700 to 2000, more preferably from 800 to 2000, particularly preferably from 800 to 1800, even more preferably from 800 to 1500, and above all, most preferably from 800 to 1200.

The hydroxyl value of the polyester polyol according to an embodiment of the present invention is approximately, for example, from 45 to 224, preferably from 56 to 160, more preferably from 58 to 150, even more preferably from 60 to 150, particularly preferably from 62 to 140, even more preferably from 75 to 140, and above all, most preferably from 94 to 140. Note that the hydroxyl value of the polyester polyol is a value obtained by quantitatively determining, with potassium hydroxide, the free acetic acid produced by acetylation of the polyester polyol with acetic anhydride, and is expressed by the number of milligrams of potassium hydroxide of an amount equivalent to the hydroxyl groups contained in 1 g of the polyester polyol.

The polyester polyol according to an embodiment of the present invention can be suitably used as a raw material for a polyurethane.

[Method of Producing Polyester Polyol]

The polyester polyol described above can be produced by, for example, using a compound represented by Formula (11) below as an initiator in the presence of 1 to 20 ppm of a tin compound, and subjecting a cyclic ester to ring-opening polymerization with the initiator:

[Chem. 6]

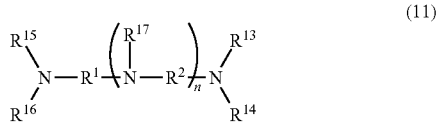

(11)

(In Formula (11), $R^1$ and $R^2$ represent, identically or differently a divalent hydrocarbon group, and n represents an integer. $R^{13}$ to $R^{17}$ represent, identically or differently a hydrogen atom or a monovalent hydrocarbon group.)

$R^1$, $R^2$, and n in Formula (11) above are the same as $R^1$, $R^2$, and n in Formula (1) above.

In Formula (11) above, $R^{13}$ to $R^{17}$ are groups corresponding to $R^3$ to $R^7$ in Formula (1) above, and examples of monovalent hydrocarbon groups of $R^{13}$ to $R^{17}$ in Formula (11) above include the same examples as the monovalent hydrocarbon groups of $R^3$ to $R^7$ in Formula (1) above. Note that at least two of the groups represented by $R^{13}$ to $R^{17}$ are preferably hydrogen atoms.

Of the compounds represented by Formula (11), an aliphatic polyamine in which $R^1$ and $R^2$ in the formula are divalent aliphatic hydrocarbon groups (preferably linear or branched alkylene groups having from 1 to 10 carbons) is preferable, such as 1,2-ethylenediamine, 1,2-diaminopropane, 1,4-butylenediamine, 1,6-hexamethylenediamine, diethylenetriamine, triethylenetetramine, tetraethylenepentamine, dipropylenetriamine, and N,N-diethyl-1,3-diaminopropane, and aliphatic diamines are particularly preferable.

The polyester polyol according to an embodiment of the present invention is characterized by using a compound represented by Formula (11) above as an initiator.

Examples of the cyclic ester that is reacted with a compound represented by Formula (11) above include compounds represented by Formula (12) below.

[Chem. 7]

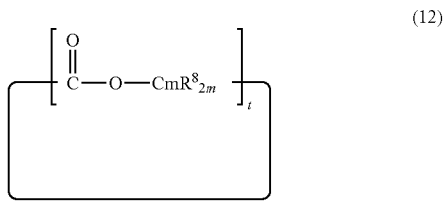

(12)

(In Formula (12), m and t represent, identically or differently an integer of 1 or greater. 2m occurrences of $R^8$ represent, identically or differently a hydrogen atom, an alkyl group, or an alkoxy group.)

In Formula (12) above, t is an integer of 1 or greater, and for example, may be an integer from 1 to 3, and is preferably 1 or 2. $R^8$ and m are the same as $R^8$ and m in Formula (2) above.

Examples of the cyclic ester include cyclic esters having from 1 to 10 carbons such as α-acetolactone, β-propiolactone, γ-butyrolactone, δ-valerolactone, ε-caprolactone, methylated ε-caprolactone, lactide, and glycolide.

The usage amount of the cyclic ester is, for example, from 1 to 100 mol, preferably from 1 to 50 mol, particularly preferably from 1 to 20 mol, and even more preferably from 1 to 15 mol, per mole of the compound represented by Formula (11). The molecular weight of the resulting polyester polyol can be adjusted by controlling the usage amount of the cyclic ester that reacts with the compound represented by Formula (11).

The ring-opening polymerization reaction of the cyclic ester is carried out in the presence of a tin compound as a catalyst. Examples of the tin compound include tin(II) octylate, dibutyltin dilaurate, tin(II) chloride, tin(IV) chloride, tin(II) bromide, tin(II) iodide, dibutyltin dichloride, butyltin trichloride, monobutyltin oxide, dibutyltin oxide, monobutyltin tris(2-ethylhexyl mercapto-acetate), monobutyltin tris(isooctyl mercapto-acetate), monobutyltin triacetate, and monobutyltin tris(2-ethylhexanoate). One of these compounds can be used alone or at least two can be used in combination.

Relative to the total amount of the cyclic ester and the compound represented by formula (11), the usage amount of the tin compound (total amount when at least two types are used in combination) is, for example, from 1 to 20 ppm, preferably from 1 to 10 ppm, particularly preferably from 2 to 8 ppm, and most preferably from 3 to 7 ppm. When the usage amount of the tin compound exceeds the aforementioned range, it tends to be difficult to obtain a polyester polyol having a narrow molecular weight distribution. When the usage amount of the tin compound is less than the aforementioned range, it tends to be difficult to obtain an effect of promoting reaction progression.

The reaction temperature in the ring-opening polymerization of the cyclic ester is preferably at least 120° C., particularly preferably from 120 to 210° C., even more preferably from 150 to 200° C., and above all, most preferably from 160 to 180° C. If the reaction temperature is too low, the reaction rate tends to become slow. On the other hand, when the reaction temperature is too high, coloration occurs due to the transesterification reaction, and a decomposition reaction of the resulting polymer proceeds, and as a result, it tends to be difficult to obtain a polyester polyol with good hue and a narrow molecular weight distribution. The reaction time is approximately, for example, from 3 to 30 hours. Furthermore, the reaction pressure is approximately, for example, from 0.7 to 1.5 atm.

The reaction atmosphere of the ring-opening polymerization of the cyclic ester is not particularly limited as long as the reaction atmosphere does not inhibit the reaction, and for example, an inert gas atmosphere such as a nitrogen atmosphere or an argon atmosphere is preferable.

In addition, bulk polymerization, solution polymerization, or suspension polymerization can be employed as the polymerization method in the ring-opening polymerization reaction of the cyclic ester. As the solvent used in the abovementioned solution polymerization, aromatic hydrocarbons such as toluene and xylene are preferable because they have a relatively high boiling point and are inert in the reaction. Desirably, the solvent is substantially anhydrous.

The polymerization reaction can be carried out by any method, such as a batch method, a semi-batch method, and a continuous method. After the completion of the reaction, the resulting reaction products can be separated and purified through a separation and purification means such as filtration, concentration, distillation, extraction, crystallization, recrystallization, adsorption, and column chromatography, or through a means that is a combination thereof.

[Polyurethane]

The polyurethane according to an embodiment of the present invention is characterized by having a segment (1) formed from a product of addition polymerization of the polyester polyol and polyisocyanate.

The polyurethane according to an embodiment of the present invention has the segment (1) formed from a product of addition polymerization of a polyester polyol and a polyisocyanate, but the polyester polyol constituting the segment (1) has at least two amide bonds. Therefore, the molecular chains of at least two polyurethanes form hydrogen bonds with each other at the amide bond sites, and thereby easily form a physically crosslinked structure, and as a result, the polyurethane according to an embodiment of the present invention excels in durability and solvent resistance while exhibiting flexibility.

Furthermore, since the polyurethane according to an embodiment of the present invention uses, as a raw material, a polyester polyol having a very narrow molecular weight distribution, hydrogen bonds are formed uniformly across the entire molecular chain of the polyurethane due to the amide bonds of the polyester polyol, and a physically crosslinked structure is formed. Therefore, the polyurethane excels particularly in durability and solvent resistance.

Examples of the polyisocyanate include diisocyanate compounds, such as 2,4-tolylene diisocyanate, 2,6-tolylene diisocyanate, 1,3-xylene diisocyanate, 1,4-xylene diisocyanate, xylylene diisocyanate, 1,5-naphthalene diisocyanate, m-phenylene diisocyanate, p-phenylene diisocyanate, diphenylmethane diisocyanate, 4,4'-diphenylmethane diisocyanate, 4,4'-dibenzyl diisocyanate, isophorone diisocyanate, hexamethylene diisocyanate, dicyclohexylmethane diisocyanate, 2,2,4-trimethylhexamethylene diisocyanate, and 2,4,4-trimethylhexamethylene diisocyanate; diisocyanate compounds obtained by hydrogenation of an aromatic isocyanate compound from among the abovementioned diisocyanate compounds (for example, diisocyanate compounds such as hydrogenated xylylene diisocyanate and hydrogenated diphenylmethane diisocyanate); trivalent or higher isocyanate compounds, such as triphenylmethane triisocyanate, and dimethylene triphenyl triisocyanate; and multimerized polyisocyanates obtained by multimerizing these. One of these polyisocyanates can be used alone or two or more can be used in combination.

A polyurethane according to an embodiment of the present invention can be manufactured, for example, by an addition reaction of the polyester polyol and a polyisocyanate.

The temperature of the addition reaction between the polyester polyol and the polyisocyanate is preferably from 60 to 90° C.

Furthermore, in addition to the abovementioned segment (1), a polyurethane according to an embodiment of the present invention may also have a segment (2) formed from a product of addition polymerization with the polyisocyanate and a chain extender or crosslinking agent [for example, a compound containing at least two groups (for example, hydroxyl groups, amino groups, or the like) that are reactive with an isocyanate group]. Note that when the polyurethane according to an embodiment of the present invention has a segment (1) and a segment (2), the segment (1) and segment (2) may be randomly provided or may be regularly contained. That is, a polyurethane according to an embodiment of the present invention may be a random copolymer or a block copolymer, of segments (1) and (2).

The chain extender is preferably a compound having two groups that are reactive with an isocyanate group. Furthermore, a compound having three or more groups that are reactive with an isocyanate group is preferable as the crosslinking agent.

A linear segment (2) can be formed if the abovementioned chain extender is used. On the other hand, when the abovementioned crosslinking agent is used, a branched chain segment (2) can be formed.

When the polyurethane according to an embodiment of the present invention has a linear segment (2) along with the segment (1) described above, the polyurethane can be suitably used as a thermoplastic polyurethane.

Meanwhile, when the polyurethane according to an embodiment of the present invention has a branched segment (2) along with the segment (1) described above, the polyurethane can be suitably used as a thermosetting polyurethane.

The molecular weight (or weight average molecular weight) of the compound having at least two groups that are reactive with the isocyanate group is, for example, from 100 to 1000, and in this range, from the perspective of being able to form a harder segment (2) compared to the segment (1), and thereby being able to impart the polyurethane with particularly excellent durability (specifically, particularly excellent tensile strength and tear strength), the molecular weight thereof is preferably from 100 to 600, particularly preferably from 100 to 500, and most preferably from 100 to 300.

Compounds having at least two groups that are reactive with the isocyanate group include polyols, polyamines, and amino alcohols. Note that these compounds do not include the polyester polyol represented by Formula (1) above.

Examples of the polyol include aliphatic polyols having from 1 to 10 carbons, such as ethylene glycol, 1,4-butanediol, 1,4-butanediol, 1,6-hexamethylene diol, glycerin, and trimethylolpropane; as well as polyester polyols, polyether polyols, and polycarbonate polyols obtained by using these polyols as initiators, and subjecting a cyclic ester to a ring-opening polymerization with the initiator.

Examples of the polyamine include aliphatic polyamines, such as ethylene diamine, propylene diamine, 1,3-diaminopentane, and 2-methyl-1,5-pentanediamine; and alicyclic polyamines such as 1-amino-3-aminomethyl-3,5,5-trimethylcyclohexane, and 4,4'-dicyclohexylmethanediamine.

Examples of the amino alcohol include N-methylethanolamine, diethanolamine, and diisopropanolamine.

As the polyisocyanate that forms the segment (2), a compound similar to the polyisocyanate that forms the segment (1) can be used.

The amount of polyisocyanate and polyester polyol used in the addition reaction is such that the molar ratio of isocyanate groups of the polyisocyanate to the hydroxyl groups contained in the polyester polyol [(isocyanate groups)/(hydroxyl groups)] (=NCO/OH) is, for example, a ratio from 0.5 to 2.0, and preferably from 0.8 to 1.2.

In a case where a polyester polyol and a compound having at least two groups that are reactive with isocyanate groups are used together in an addition reaction with a polyisocyanate, the molar ratio of the isocyanate groups contained in the polyisocyanate to the total amount of hydroxyl groups and amino groups contained in these compounds [(isocyanate groups)/(hydroxyl groups+amino groups)] is, for example, from 0.5 to 2.0, and preferably from 0.8 to 1.2.

When the polyurethane has the segment (1) and the segment (2), the ratio of segments (1) and segments (2) can be adjusted, as appropriate, according to the application of the polyurethane. In an application requiring more superior durability, the ratio of the segments (2) is preferably set to a larger ratio. Relative to the total content of the polyester polyol forming the segment (1) and the compound having at least two groups that are reactive with the isocyanate group forming the segment (2), the addition amount of the compound having at least two groups that are reactive with the isocyanate groups is approximately, for example, from 1 to 10 wt. %, and preferably from 5 to 10 wt. %.

Examples of methods for producing a polyurethane having a segment (1) and a segment (2) include a prepolymer method in which a polyester polyol and an excess amount of polyisocyanate are reacted to produce a urethane prepolymer (=segment (1)) having a terminal isocyanate group, and then reacting the urethane prepolymer with a compound having at least two groups that are reactive with the isocyanate group to obtain a polyurethane having segments (1) and segments (2) in blocks; and a one-shot method in which a polyester polyol, a compound having at least two groups that are reactive with the isocyanate groups, and a polyisocyanate are simultaneously reacted to obtain a polyurethane randomly having segments (1) and segments (2).

EXAMPLES

Hereinafter, the present invention will be described more specifically with reference to examples, but the present invention is not limited by these examples.

Example 1 (Production of Polyester Polyol)

116.2 g of 1,6-hexamethylene diamine and 883.8 g of ε-caprolactone were inserted into a 5-neck flask under a nitrogen atmosphere in the presence of 5 ppm of tin(II) octylate, after which the temperature was increased to 170° C., and a polymerization reaction was carried out. After the concentration of the residual ε-caprolactone was confirmed through gas chromatography to be less than 1.0%, the material was cooled. A polyester polyol (1) having a molecular weight distribution (Mw/Mn) of 1.1, a number average molecular weight of 1000, and a hydroxyl value of 111.2 was obtained as a product.

Example 2 (Production of Polyester Polyol)

A polyester polyol was produced in the same manner as in Example 1 with the exception that 58.1 g of 1,6-hexamethylene diamine and 941.9 g of ε-caprolactone were used. A polyester polyol (2) having a molecular weight distribution (Mw/Mn) of 1.1, a number average molecular weight of 2000, and a hydroxyl value of 56.9 was obtained as a product.

Comparative Example 1 (Production of Polyester Polyol)

A polyester polyol was produced in the same manner as in Example 1 with the exception that 10 ppm of tetra-n-butoxy titanium was used in place of the 5 ppm of tin(II) octylate. A polyester polyol (3) having a molecular weight distribution (Mw/Mn) of 1.2, a number average molecular weight of 1000, and a hydroxyl value of 111.7 was obtained as a product.

Note that the molecular weight distribution was measured by the following method.

<Molecular Weight Distribution=Mw/Mn>

The number average molecular weight (Mn) and weight average molecular weight (Mw) were determined through comparison with a polystyrene standard using a high-speed GPC device, and the ratio thereof was used as an index of the molecular weight distribution.

Measurement Conditions

Measurement device: "HLC-8220GPC" high-speed GPC device, available from Tosoh Corporation Mobile phase: tetrahydrofuran

Example 3 (Production of Polyurethane)

The polyester polyol (1) as a polyol (A) and trimethylolpropane as a crosslinking agent (C) were inserted into a flask at the ratios described in the following table, and then and heated to 80° C. and mixed. Subsequently, 4,4'-diphenylmethane diisocyanate was inserted at a ratio such that NCO/OH (molar ratio)=1.05, and then mixed for 30 seconds to obtain a mixed solution.

The obtained mixed liquid was cast, and compression molded for 15 minutes at 120° C. using a compression molding machine. Subsequently, the resulting product was removed from the compression molding machine and subjected to secondary curing for 16 hours at 120° C., and a polyurethane (1) (=thermosetting polyurethane) was obtained.

The obtained polyurethane (1) was then subjected to the following evaluations.

Hardness: Measured with a method in accordance with ISO 7619-1.

Elongation: Measured with a method in accordance with ISO 34.

Tensile strength: Measured with a method in accordance with ISO 34.

Tear strength: Measured with a method in accordance with ISO 37.

Solvent resistance: Measured with a method in accordance with ISO 1817. Specifically, a test piece was immersed for 24 hours in a solvent at room temperature, and solvent resistance was evaluated from the change in weight of the test piece before and after testing.

Examples 4 to 8 and Comparative Examples 2 to 19

Polyurethanes were obtained in the same manner as in Example 3 with the exception that the formulations were changed as described in the table below.

[Table 1]

To summarize the above, configurations and variations according to an embodiment of the present invention will be described below.

[1] A polyester polyol represented by Formula (1) having a molecular weight distribution of less than 1.2.

[2] The polyester polyol according to [1], having the number average molecular weight of from 500 to 2500.

[3] The polyester polyol according to [1] or [2], wherein $R^1$ and $R^2$ in Formula (1) represent, identically or differently a divalent aliphatic hydrocarbon group.

[4] The polyester polyol according to any one of [1] to [3], wherein m in Formula (2) is 5 or 6.

TABLE 1

| | Polyol (A) | Polyisocyanate (B) | Crosslinking agent (C) | C/(A + C) (wt. %) | Hardness (A) | Elongation (%) | Tensile Strength (MPa) | Tear Strength (KN/m) | Solvent Resistance (Weight change (%) after solvent immersion) | | |
|---|---|---|---|---|---|---|---|---|---|---|---|
| | | | | | | | | | Toluene | Acetone | Cyclohexanone |
| Example 3 | A-1 | B-1 | C-1 | 8 | 95 | 176 | 33.6 | 98.8 | 10.3 | 51.4 | 35.4 |
| Example 4 | A-1 | B-1 | C-1 | 4 | 64 | 297 | 23.1 | 32.8 | 22.6 | 65.6 | 72 |
| Example 5 | A-1 | B-1 | C-1 | 3 | 63 | 345 | 25.5 | 35.7 | 30 | 69.2 | 81.6 |
| Example 6 | A-1 | B-1 | C-2 | 26 | 66 | 223 | 12.3 | 23.9 | 21.8 | 59.4 | 65.1 |
| Example 7 | A-1 | B-1 | C-2 | 15 | 63 | 330 | 25.3 | 30.8 | 46.9 | 70 | 100.5 |
| Example 8 | A-1 | B-1 | C-2 | 11 | 59 | 408 | 23 | 30.1 | 37.9 | 85.3 | 131.7 |
| Comparative Example 2 | A-3 | B-1 | C-1 | 8 | 75 | 186 | 12.2 | 24.2 | 14.6 | 54.2 | 53 |
| Comparative Example 3 | A-3 | B-1 | C-1 | 4 | 66 | 313 | 22.9 | 30.5 | 26.6 | 64.9 | 126 |
| Comparative Example 4 | A-3 | B-1 | C-1 | 3 | 63 | 317 | 22.4 | 30.4 | 27.7 | 65.9 | 123.7 |
| Comparative Example 5 | A-4 | B-1 | C-1 | 8 | 70 | 249 | 16.4 | 26.4 | 49.2 | 75.3 | 140.4 |
| Comparative Example 6 | A-4 | B-1 | C-1 | 4 | 66 | 229 | 5.1 | 22.2 | 60.2 | 81.8 | 155.3 |
| Comparative Example 7 | A-4 | B-1 | C-1 | 3 | 65 | 258 | 4.6 | 33.3 | 68.7 | 85.1 | 159.8 |
| Comparative Example 8 | A-5 | B-1 | C-1 | 8 | 75 | 212 | 10.1 | 32 | 11.1 | 75.4 | 81.1 |
| Comparative Example 9 | A-5 | B-1 | C-1 | 4 | 63 | 340 | 8.9 | 32.1 | 18.1 | 89.5 | 128.7 |
| Comparative Example 10 | A-5 | B-1 | C-1 | 3 | 58 | 460 | 12 | 28.5 | 24.6 | 110.6 | 187.2 |
| Comparative Example 11 | A-6 | B-1 | C-1 | 8 | 72 | 189 | 21.9 | 23.6 | 48.8 | 67.2 | 102.5 |
| Comparative Example 12 | A-6 | B-1 | C-1 | 4 | 66 | 248 | 9 | 25 | 64 | 76.8 | 146.4 |
| Comparative Example 13 | A-6 | B-1 | C-1 | 3 | 62 | 345 | 19.6 | 29.4 | 69.8 | 87.3 | 171.7 |
| Comparative Example 14 | A-7 | B-1 | C-1 | 8 | 94 | 163 | 30.7 | 44.8 | 51.7 | 60.5 | 69.1 |
| Comparative Example 15 | A-7 | B-1 | C-1 | 4 | 70 | 267 | 19.9 | 24.4 | 72.2 | 73.4 | 114.5 |
| Comparative Example 16 | A-7 | B-1 | C-1 | 3 | 66 | 337 | 17.5 | 23.8 | 83.9 | 80.2 | 148.3 |
| Comparative Example 17 | A-8 | B-1 | C-1 | 8 | 70 | 129 | 5 | 15.5 | 71.4 | 59.7 | 126 |
| Comparative Example 18 | A-8 | B-1 | C-1 | 4 | 66 | 96 | 2.7 | 13 | 92.2 | 66.1 | 152.8 |
| Comparative Example 19 | A-8 | B-1 | C-1 | 3 | 65 | 75 | 2.1 | 11.3 | 107.1 | 65.3 | 169.1 |

Abbreviations in Table 1 are described below:
A-1: Polyester polyol (1) obtained in Example 1
A-3: Polyester polyol (3) obtained in Comparative Example 1
A-4: Polycaprolactone diol (number average molecular weight: 1000, hydroxyl value: 113.1, Mw/Mn = 1.2, PLACCEL 210 N, available from Daicel Corporation)
A-5: Ethylene glycol-adipic acid condensation-based polyester diol (number average molecular weight: 1000, hydroxyl value: 115.5, Mw/Mn = 1.5, CMA1024, available from Huada Chemical Group Co., Ltd.)
A-6: 1,6-hexanediol-adipic acid condensation-based polyester diol (number average molecular weight: 1000, hydroxyl value: 117.3, Mw/Mn = 1.4, CMA1066, available from Huada Chemical Group Co., Ltd.)
A-7: Polycarbonate diol (number average molecular weight: 1000, hydroxyl value: 114.2, Mw/Mn = 1.5, Eternacol UH-100, available from Ube Industries, Ltd.)
A-8: Polytetramethylene ether glycol (number average molecular weight: 1000, hydroxyl value: 114.7, Mw/Mn = 1.6, PolyTHF, available from BASF SE)
B-1: 4,4-diphenylmethane diisocyanate, (Millionate MT, available from Tosoh Corp.)
C-1: Trimethylolpropane
C-2: Polycaprolactone triol (number average molecular weight: 550, PLACCEL 305, available from Daicel Corporation)

[5] The polyester polyol according to any one of [1] to [4], wherein the hydroxyl value is from 45 to 224.

[6] A method of producing the polyester polyol described in any one of [1] to [5], in which a compound represented by Formula (11) is used as an initiator in the presence of from 1 to 20 ppm of a tin compound, the method comprising subjecting a cyclic ester to ring-opening polymerization with the initiator.

[7] The method of producing the polyester polyol according to [6], wherein the amount of cyclic ester subjected to ring-opening polymerization is from 1 to 100 mol per mole of the compound represented by Formula (11).

[8] A polyurethane having a segment formed from a product of addition polymerization of the polyester polyol described in any one of [1] to [5] and a polyisocyanate.

[9] The polyurethane according to [8], further including a segment formed from a product of addition polymerization of a polyisocyanate and a compound other than the polyester polyol but containing at least two groups having reactivity with an isocyanate group.

INDUSTRIAL APPLICABILITY

The polyester polyol of the present invention is suitable as a raw material for a polyurethane excelling in water resistance, flexibility, durability, and solvent resistance.

Furthermore, a polyurethane obtained using the above-mentioned polyester polyol as a raw material also exhibits water resistance, flexibility, durability, and solvent resistance. Therefore, the obtained polyurethane can be suitably used in various molded products, fibers, films, sheets, resin or elastomer raw materials, modifiers, paints, adhesives, and the like.

The invention claimed is:

1. A polyurethane comprising a segment I and a segment II,
wherein the segment I is a product of addition polymerization of a polyester polyol (1) and a polyisocyanate,
wherein the polyester polyol (1) is a compound represented by Formula (1) having a molecular weight distribution of less than 1.2:

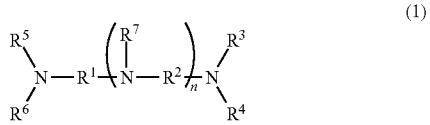

where, in Formula (1), $R^1$ and $R^2$ represent, identically or differently a divalent hydrocarbon group, n represents an integer, $R^3$ to $R^7$ represent, identically or differently a hydrogen atom, a monovalent hydrocarbon group, or a group represented by Formula (2):

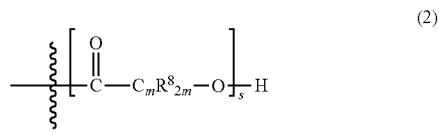

where, in Formula (2), m and s represent, identically or differently an integer of 1 or greater; and 2m occurrences of $R^8$ represent, identically or differently a hydrogen atom, an alkyl group or an alkoxy group, and
at least two of the groups represented by $R^3$ to $R^7$ are represented by Formula (2), and
the segment II is a product of addition polymerization of a compound (2) and a polyisocyanate,
wherein the compound (2) is a compound containing at least two groups that are reactive with an isocyanate group, and the compound (2) is a compound other than the polyester polyol (1), and
a content of the compound (2) to the total content of the polyester polyol (1) and the compound (2) is from 5 to 10 wt. %.

2. The polyurethane according to claim 1, further comprising a segment formed from a product of addition polymerization of a polyisocyanate and a compound other than the polyester polyol but containing at least two groups having reactivity with an isocyanate group.

3. The polyurethane according to claim 1, wherein the polyester polyol (1) has a number average molecular weight from 500 to 2500.

4. The polyurethane according to claim 1, wherein $R^1$ and $R^2$ in Formula (1) represent, identically or differently a divalent aliphatic hydrocarbon group.

5. The polyurethane according to claim 1, wherein m in Formula (2) is 5 or 6.

6. The polyurethane according to claim 1, wherein the polyester polyol (1) has a hydroxyl value from 45 to 224.

7. The polyurethane according to claim 1, wherein the polyester polyol (1) is a compound produced by a method comprising subjecting 1 to 100 mole of a cyclic ester to ring-opening polymerization with 1 mole of an initiator, in the presence of 1 to 20 ppm of a tin compound,
wherein the initiator is a compound represented by Formula (11);

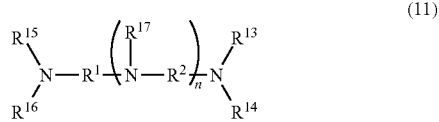

wherein, in Formula (11), $R^1$ and $R^2$ represent, identically or differently, a divalent hydrocarbon group, n is an integer, and $R^{13}$ to $R^{17}$ represent, identically or differently, a hydrogen atom or a monovalent hydrocarbon group.

* * * * *